3,730,719

METHOD AND ARTICLE FOR COLOR KINESCOPE SCREEN AND MASK PRODUCTION

Harold Bell Law, Princeton, N.J., assignor to RCA Corporation

Continuation of abandoned application Ser. No. 834,759, June 19, 1969. This application June 15, 1971, Ser. No. 153,419
Int. Cl. G03c 5/00
U.S. Cl. 96—36.1 2 Claims

ABSTRACT OF THE DISCLOSURE

A method for producing a color kinescope having an image screen including a plurality of phosphor areas and a color selection barrier prepared from a preliminary mask used for screen printing. The preliminary mask is made by disposing an apertured layer of a second metal on one surface of a substrate of a first metal, disposing a perforated resist film on another such surface, etching portions of the substrate therebetween to provide apertures larger than those of the metal layer, and removing the resist film. The preliminary mask is used for printing the phosphor areas and the apertured metal layer removed to produce a color selection barrier. The preliminary mask may be used to provide a dark matrix to the image screen.

This application is a continuation of Ser. No. 834,759, filed June 19, 1969, now abandoned.

BACKGROUND OF THE INVENTION

This invention relates to color kinescopes and particularly both to a novel method for making a color kinescope having an image screen which includes phosphor areas printed with a preliminary mask having temporary apertures of a first size, which preliminary mask is subsequently converted into a permanent color selection barrier with apertures of a larger second size, and to a preliminary mask structure.

The prior art discloses color kinescopes individually having both an image screen which includes a multiplicity of groups of elemental phosphor deposits, the elemental deposits of each one of such groups emitting light of a different color when struck by an electron beam, and a color selection barrier, or mask, disposed between the image screen and the electron source of the kinescope. Such color selection barriers and their mode of operation are well known. Briefly, however, color selection barriers, or masks, include those types known as (1) shadow masks (including those shadow masks having apertures which are substantially circular in cross-section and those whose apertures are substantially slot-shaped, the latter also being known as "grill-type" shadow masks) and (2) those masks (referred to herein as "lensing masks") used to provide an electron-optical lens effect on the electrons directed toward the screen (including those lensing masks having circular and slot-shaped apertures), such lensing masks including focusing masks, which are known in the art. Such color selection barriers may be of a planar, or a spherical or some other non-planar configuration, the configuration of a particular color selection barrier generally being similar to that of the image screen with which it is used. Also known in the art are continuous manufacturing processes for producing a number of such color selection barriers from a long band of conductive material.

Most commercial screen printing procedures involve using a color selection barrier having apertures of a desired ultimate size as a master for photographically printing the phosphor areas of an image screen. The color selection barrier, with the size of its apertures unchanged, is then used as such in a color kinescope. However, the apertures of many color selection barriers used in prior art color kinescopes, especially those of the shadow mask variety, are of such size (the same size apertures being used for both the screen printing function and for the color selection function, such apertures being referred to herein as "bifunctional apertures") and the electrode operating voltages of such kinescopes are of such magnitudes that an electron beam impinges only a relatively small proportion of each one of its respective phosphor areas.

To increase the proportion of each phosphor area impinged by an electron beam (and, thereby increase the brightness of the image of a color kinescope) the prior art discloses color selection barriers (of the shadow mask type) having bifunctional apertures individually larger than the individual phosphor areas of respective image screen associated therewith. Such larger (in comparison with the phosphor areas) apertures provide electron beam spots of greater size (as measured at the screen) than respective individual phosphor areas, so that a larger proportion of each phosphor area is impinged than in previous kinescopes. One method disclosed in the prior art for providing phosphor areas smaller than the apertures of the color selection barrier involves selecting the size of the light source used in screen printing so that, because of penumbra effects, a proper size phosphor area can be secured by controlling the exposure time of the various phosphors which are printed. This method is not commercially attractive for several reasons. One reason is that the obtainable difference in size between the apertures and the phosphor areas is limited so that comparatively large differences therebetween are difficult, if not impossible, to achieve. A second reason is that, because the phosphor dot size is a function of exposure time, the process requires very carefully measured exposure times to obtain properly-sized phosphor dots. Another reason is that this method is very sensitive to non-uniformities in the amounts of light striking various parts of the screen being printed, so that the light distribution must be very carefully regulated to minimize size variations among the printed phosphor dots. As an alternative to this method, the prior art discloses a method whereby a "dark matrix" of opaque material is produced on the kinescope faceplate by controlling the exposure time, as above. Thereafter, phosphor dots are produced, by printing, at the openings in the matrix, with portions of the dots disposed on the matrix itself. However, this alternative method also suffers from at least the first disadvantage above in that there is a limit to the obtainable difference between the aperture size and the "effective" size of the phosphor dots (i.e., the size of the phosphor dot portion which is not disposed on the matrix).

To increase the image brightness in kinescopes having color selection barriers of the focusing mask variety, the prior art discloses barriers having apertures of an ultimate size considerably larger than individual phosphor areas associated therewith. Such barriers have considerably higher electron transmissivity than previous barriers so that more electrons are made available to impinge the phosphor areas and, possibly, larger electron beam spots are obtained. However, color selection barriers containing these apertures of ultimate size are unsuitable for printing the phosphor areas of the image screen, since to do so would produce phosphor areas of greater size, which would substantially offset the increase in electron beam spot size and thereby substantially bring about the previous situation of electron beam impingement of only a relatively small proportion of the phosphor areas. In order to allow the use of an apertured member as a photographic master for screen printing and the subsequent use thereof as a color selection barrier exhibiting increased electron transmissivity, the prior art has sought ways to provide, and use for screen printing, a preliminary mask having temporary apertures of a first size and thereafter enlarge the apertures to a significantly larger ultimate size, this with the substantial maintenance of the desired kinescope operating tolerances. The use of a preliminary mask having temporary apertures of suitable dimensions as a photographic master for "printing" the phosphor areas of image screens and thereafter providing larger ultimate-size apertures therein to convert the preliminary mask to a mask, or color selection barrier, for use as such in a color kinescope, is referred to herein as "post-printing aperture enlargement." As used with respect to this invention, a "color selection barrier," or "mask," is not a preliminary mask since the apertures of the former are larger in size and the former is used only for the color selection function, not screen printing. "Preliminary masks," which are used for screen printing, have temporary apertures, these temporary apertures being enlarged subsequently to provide a mask, or color selection barrier.

One method disclosed in the prior art for achieving this "post-printing aperture enlargement" involves applying to each major surface of a sheet of conductive material, a coating of a photosensitive resist material, such as bichromated glue or shellac. Each photosensitive coating is then provided, by photographic methods known in the art, with a matching pattern of perforations of a predetermined size to leave the conductive sheet partially coated with resist. This partially coated sheet is then immersed in an etching solution to open, in uncoated portions thereof, apertures of a final size desired for the color-selection barrier. These apertures of final size are greater than the individual perforations in the resist coating so that portions of the resist coating overhang the apertures in the conductive sheet. Then the partially coated sheet with apertures therein is used as a master in the well-known image screen printing operation, the light rays utilized for printing passing through and being defined by the perforations in the resist coating. The resist coatings are subsequently removed so that the apertured conductive sheet can be used as a color-selection barrier, or mask.

In another method, a conductive sheet is provided with a perforated resist coating, as in the method discussed above and then immersed in an etching solution to open, in the uncoated portions thereof, apertures of an initial size which is substantially equal to the size of the resist perforations. The apertured, coated sheet is then utilized as a master in the printing of the phosphor areas of the image screen. Thereafter, the apertured, coated sheet is again immersed in the etching solution to remove additional material from beneath the resist coating, enlarging the apertures of initial size and thereby providing apertures of a larger final dimension. The resist coatings are then removed and the conductive sheet with apertures of final dimension is used as a color selection barrier.

However, because of several reasons, both these methods are not completely satisfactory from a commercial standpoint, especially in those cases where the color selection barrier is desired to have a non-planar final configuration. One reason is that the bichromated glue and shellac, as well as comparable organic resist materials disclosed in the prior art, deteriorate at the annealing temperatures (e.g., about 900° F.) generally employed in producing non-planar masks by the continuous mask-making processes mentioned above. More specifically, in these continuous mask-making processes, a flat band of a suitable conductive material (e.g., cold rolled steel), which is in a comparatively hard condition, is passed through the mask-making equipment where the band is, inter alia, provided with suitable apertures. The conductive material is used in a relatively hard condition to impart strength thereto and thereby minimize tearing and/or deformation of the band while it is being passed through the mask-making equipment. When a non-planar mask is required, it is generally desirable to shape the mask to the desired configuration after the mask-making operation is completed but before the screen-printing operation. For such a shaping operation, it is desirable, first, to anneal (at about 900° F. for 10 minutes) the mask, which is still in a comparatively hard condition, in order to reduce the hardness, and thereby facilitate the shaping, thereof. After the mask is annealed and shaped, it is generally mounted on a frame and used as a master for printing the phosphor areas of the image screen in a manner known in the art (see U.S. Pat. 3,406,068). As indicated with respect to both of the above methods, the perforated resist coating is required to remain on the preliminary mask during the screen-printing operation, which necessitates the resist coating's remaining on the preliminary mask throughout the preceding annealing operation. However, the aforementioned resist materials (i.e., shellac and glue), as well as other organic resists known in the art, are not capable of withstanding these annealing temperatures. As a result, color selection barriers made by either by the above methods must be made from a sheet of comparatively soft material in order to avoid annealing of the preliminary masks and yet allow the shaping thereof with relative ease. The use of such comparatively soft materials results, however, in the following: (a) an increased incidence of tear and/or deformation of the conductive band where continuous manufacturing processes are used, which leads to a relatively low production yield, and (b) the desirability of using a batch-type, as compared to a continuous, process for making such masks, in order to minimize tearing and/or deformation. Where a batch-type, instead of a continuous, process is used, however, sheets of conductive material from which preliminary masks are to be produced are required to be handled individually in the operation. This results in an increase in the time and cost of making such preliminary masks.

Another reason is that shellac, glue, and other comparable resist materials disclosed in the prior art are comparatively fragile so that care must be taken in the manufacture and handling of the preliminary masks to avoid breaking and otherwise injuring the resist.

Furthermore, the former method above is not completely commercially satisfactory for the further reason that the resist materials, such as shellac and glue, as well as other resist known in the art, used in that method are not completely opaque. Hence, opaquing materials are required to be added to the resist material to minimize the amount of light passing therethrough during the screen printing operation. This addition of opaquing materials involves additional steps in the manufacture of the kinescope. Also, because in the former method, portions of the resist coating overhang the final size apertures in the preliminary mask and because the prior art resist materials used therein are comparatively fragile, considerable care must be exercised in handling the preliminary mask to avoid breakage of these overhanging portions.

Also, in the prior art, ceramic materials have been deposited on color selection barriers having apertures of a final size (which size is sufficiently large to provide the abovementioned increase in electron transmissivity) so as to temporarily reduce the size of these apertures for the screen printing operation. The color selection barriers used in this method are substantially the same as conventional barriers except for the larger apertures of the former. In this method, the ceramic is deposited at the walls of the respective final size apertures, these ceramic deposits having an annular configuration where the apertures are of circular cross-section. The color selection barrier having these temporary apertures is used in the screen printing operation. Upon completion of the screen printing operation, the ceramic materials are removed to restore the apertures in the color selection barrier to their original (i.e., final) size. Such ceramic materials have not been completely satisfactory for those commercial manufacturing processes employed to make non-planar color seleciton barriers. This is because such ceramics, though they are capable of withstanding the temperatures employed in the abovementioned annealing operation (which precedes the shaping of the color selection barrier and the subsequent screen printing operation) do not exhibit sufficient ductility to be deformed, without breaking or otherwise being injured, under the stress of the shaping operation. As a result, such ceramics often break or are otherwise injured to an extent that renders them unusable for the subsequent screen printing.

SUMMARY OF THE INVENTION

A novel method for producing a color kinescope of the type comprising an image screen including a faceplate having a plurality of phosphor areas on the inner surface thereof and a color selection barrier produced from a preliminary mask and having permanent apertures of ultimate size. The preliminary mask is made by, first, disposing a layer of a second metal having temporary apertures on the first major surface of a substrate of a first metal in the form of sheet material. The second major surface of the substrate is then provided with a perforated resist film, the perforations therein being in register with and at least as large as the temporary apertures of the metal layer. Portions of the substrate which are accessible through the temporary apertures in the metal layer and the perforations in the resist film are removed by etching to provide apertures of an ultimate size greater than the size of the temporary apertures, the temporary apertures and the perforations opening into the ultimate-size apertures. The resist film is then removed, the resulting structure comprising a preliminary mask which is used to print phosphor areas of the image screen and/or to provide a dark matrix to the image screen. The apertured second-metal layer is then removed, the resulting structure comprising a color selection barrier which is then incorporated, along with the completed image screen, in a kinescope.

A novel article consisting of a preliminary mask used as a photographic master in screen printing and subsequently fabricated into a color selection barrier. The preliminary mask is comprised of a substrate of a first metal having a plurality of permanent apertures of ultimate size and configuration therein and a removable layer of a second metal having a plurality of temporary apertures therein, the layer being disposed on a major surface of the substrate. The temporary apertures are smaller than and substantially concentric with respective permanent apertures of the substrate. The preliminary mask can also be used for providing a dark matrix to an image screen.

The novel method and article result in a number of advantages, which include, inter alia, the ability of these preliminary masks to be annealed with minimal deleterious effect thereon by the annealing temperatures employed. Such ability to withstand annealing temperatures better allows the use of continuous processes for manufacturing these preliminary masks from metal bands in a preferred relatively hard condition. This results in an increased productivity of preliminary masks (and, therefore, color selection barries) by vitue of the employment of continuous processes; a lower incidence, by virtue of the relative hardness of the metal bands, of tearing and/or deformation of the metal bands during preliminary mask production; and a lower production cost per mask. Other advantages are that the structure containing the temporary apertures (viz, the second-metal layer) is made of materials which are naturally opaque, thus obivating the need for adding opaquing agents to the materials used for the structure, opacity being necessary during the use of the preliminary mask for screen printing; which exhibit a desirable combination of strength and ductility, allowing the preliminary mask to be shaped to the desired configuration with relatively little, if any, injury to the structure containing the temporary apertures; and which exhibit comparatively high resistance to wear and to chemical attack by etching agents used to provide apertures in the substrate, such resistance allowing the temporary apertures to remain relatively unaltered during processing of the preliminary mask and during screen printing, thereby providing to the screen, phosphor areas of more uniform configuation and size.

THE PREFERRED EMBODIMENT

Figure 1:
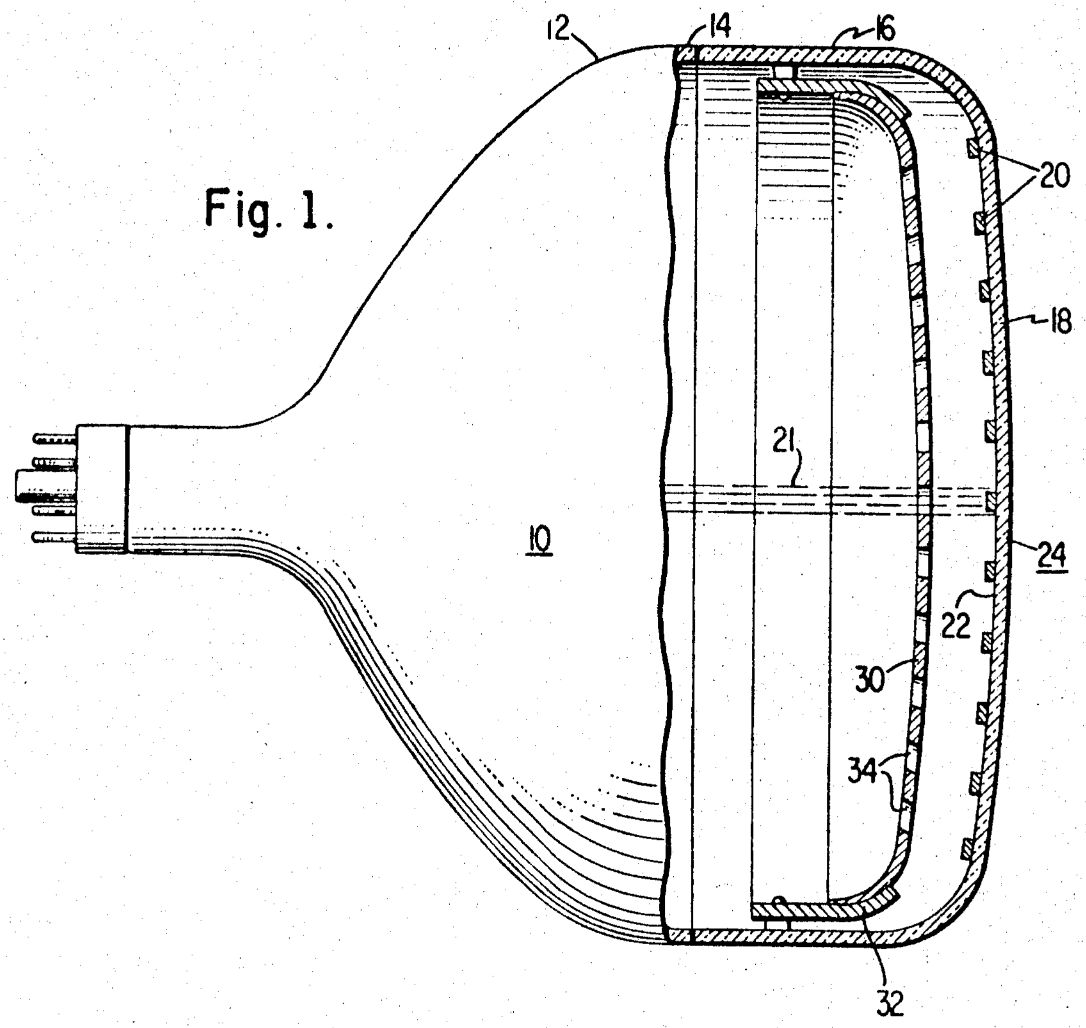
FIG. 1 is a fragmentary sectional view of a color kinescope including an image screen prepared with the use of a preliminary mask made by the present invention and a color selection barrier produced from said preliminary mask.

FIG. 1 illustrates a color kinescope 10 produced by the novel method disclosed herein, which kinescope 10 includes a glass envelope 12 comprising a funnel portion 14 and a cap 16, which cap 16 includes a transparent faceplate 18. A plurality of elemental phosphor areas 20, which collectively comprise two or more groups of different phosphors and which are individually capable of emitting luminescence of a particular color (e.g., red, blue, or green) on being struck by an electron beam 21, are deposited on the internal surface 22 of the transparent faceplate 18. The faceplate 18 and the phosphor areas 20 are collectively referred to herein as an image screen 24. The phosphor areas 20 are exaggerated in size for purposes of simplicity. The individual phosphor areas 20 are, for illustration purposes, shown as having a dot configuration, which dots may be arranged in the well-known hexagonal dot pattern (not shown). Alternatively, each phosphor area may have a stripe configuration (not shown), these stripes being arranged in a pattern (not shown) of alternating stripes of different phosphors to provide a line screen. The kinescope 10 further includes a number of electron guns and either eelctrostatic or magnetic deflection and convergence means, none of which are shown for purposes of simplicity. In generally parallel, spaced relation with the screen 24 is a color selection barrier, or mask, 30, which can be, for example, of the shadow mask or lensing mask variety, both of which are known in the art. A suitable frame 32 or other means can be used to support the color selection barrier 30. Unless stated otherwise, for purposes of illustration, the color selection barrier 30 is understood to be of the shadow mask variety, which operates at substantially the same potential as the screen 24 to form a field-free region therebetween. The color selection barrier 30 is made from a sheet or band of conducting material and has a plurality of permanent apertures 34 of ultimate size therein. As used herein, "ultimate size" means that the smallest aperture dimension presented to an electron beam passing through that aperture is of the desired magnitude for the color selection function. While the apertures 34 shown in FIG. 1 are substantially cylindrical in shape, apertures having other shapes may be used. Alternatively, the color selection barrier may be of the abovementioned "grill" type (not shown). The apertures 34 are related in size and position to respective phosphor areas 20 of the image screen 24, the size relationship being so that, where the color selection barrier is of the shadow mask variety, each permanent aperture 34 is of such size as to be capable of passing an electron beam 21 whose dimensions, as measured at the screen 24 (i.e., the spot size of the beam) are at least substantially equal to, or, preferably, larger than, the dimensions of the individual phosphor areas 20 upon which the electron beam impinges. The electron beam spot size is preferably greater than the size of the individual phosphor areas so as to provide a negative leaving tolerance but not so great that the electron beam impinges any ones other than the intended phosphor areas. In general, with a prior art mask having bifunctional apertures of a given size, the light magnification factor occurring during screen printing substantially equals to electron beam magnification factor occurring in the operation of the kinescope. This results in the size of the individual phosphor areas being considerably greater (because of a penumbra-umbra effect) than the spot size of their associated electron beam so that the beam impinges only a portion of each phosphor area. Such magnifications are familiar to the art and are caused by the light rays or the electrons, as the case may be, being provided by a source of relatively large cross-sectional areas and passing through apertures of a color selection barrier. In the present invention, therefore, the ultimate-size apertures 34 of the mask 30 are required to be significantly greater in size than their respective individual phosphor areas 20 in order for the electron beam spot to be at least equal in size to the phosphor areas. The ultimate-size apertures of a focusing-type mask (which are discussed below) are also significantly greater in size than their respective individual phosphor areas whether the focusing mask is of the positive tolerance (i.e., the beam spot is smaller than a corresponding phosphor area) or a negative tolerance (i.e., the beam spot is larger than a corresponding phosphor area) variety. In some color kinescopes in the prior art, there is a single aperture in the color selection barrier for each trio of phosphor dots (i.e., one dot each of red, green and blue phosphors). However, for purposes of simplicity, each aperture 34 is shown to correspond in position with only one phosphor area 20.

In the operation of the kinescope 10, electrons are emitted by the electron guns (not shown) and thereafter are directed, by means known in the art, as electron beams 21, through the apertures 34 to impinge upon the phosphor areas 20. Because a larger electron beam spot is produced and impinges upon substantially an entire individual phosphor area, the kinescope 10 exhibits improved characteristics, such as increased image brightness and contrast, over prior art kinescopes.

Figure 2:
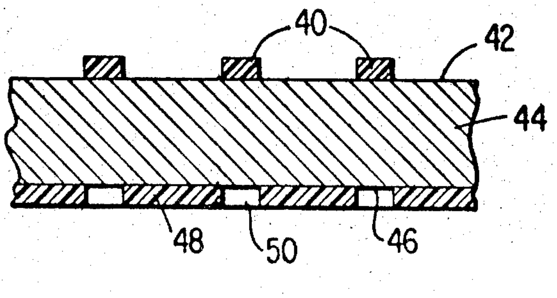
FIG. 2 is a fragmentary sectional elevation view of a structure made in an initial step of one embodiment of the present invention, the structure being a substrate partially covered with a resist.

In the first step (FIG. 2) of the mask processing sequence, a pattern of individual dots 40 of predetermined thickness and made of a photosensitive resist material is disposed, by photographic methods known in the art, on a first major surface 42 of a substrate 44 having two substantially parallel major surfaces 42 and 46. The photosensitive resist material should be substantially insoluble in the etching materials that are used in subsequent operations. Such materials include non-aqueous-based resist materials (e.g., Kodak resist or Shipley resist) and fish glue resist which is processed in a manner known in the art. The substrate 44 is comprised of a flat sheet or band of a first metal consisting essentially of steel; iron; copper; aluminum; or a copper-nickel alloy, for example. A film 48 of a photosensitive resist substantially insoluble in the etchants used and containing perforations 50 of circular cross-section is disposed, by known photographic methods, on the other major surface 46 of the substrate 44. These perforations 50, which are in substantial register with their respective resist dots 40, are at least as large as and have the same general configuration as the resist dots 40.

Figure 3:
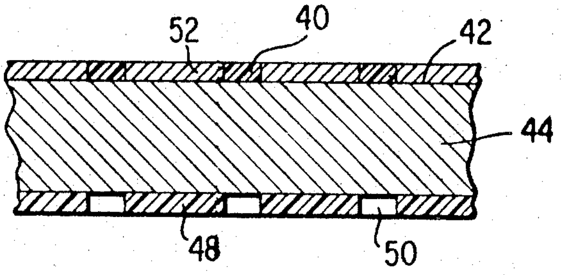
FIG. 3 is a fragmentary sectional elevation view of the structure in FIG. 2 with a metal layer provided, in a subsequent step of said embodiment, to a substrate surface.
Figure 4:
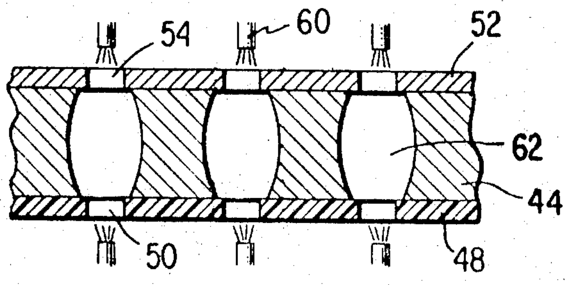
FIG. 4 is a fragmentary sectional elevation view of the structure in FIG. 3 with a portion of the resist removed, in a subsequent step of said embodiment, to provide temporary apertures in the metal layer and with apertures of a desired ultimate size provided in the substrate.

In a subsequent step (FIG. 3), a layer 52 of a second metal is then disposed on substantially all of the available portions (i.e., those not covered by the resist dots 40) of the first major surface 42 of the conductive substrate 44. The layer 52 can be provided by electroplating or electroless plating, for example, of the second metal. In order to obtain apertures in a metal layer which provide a sharper knife edge, the metal layer 52 preferably is significantly thinner in dimension than the substrate 44 but generally thicker than the resist dots 40. It is preferred that the thickness of the metal layer be less than about twenty percent of that of the substrate. When the substrate is about 0.006 inch thick, a metal layer thickness of about 0.0004 inch is satisfactory. For reasons given below, the second metal can be nickel) in order to achieve, in subsequent sequently-used etching materials than the first metal comprising the substrate. The second metal is preferably selected from the group of metals having oxidation-reduction potentials significantly lower than the first metal (for example, where the first metal is iron or steel, the second metal can be nickel) in order to achieve, in subsequent steps, a preferential etching of the first metal substrate. The second metal may consist essentially of nickel, nickel-phosphorous alloys, copper, chromium, cobalt, copper-nickel alloys, and cobalt-nickel alloys. The nickel-phosphorous alloys preferably contain less than 20 weight percent phosphorous. It is also preferred that the second metal have a melting temperature greater than the annealing temperature of the first metal. In a subsequent step (FIG. 4) of the mask processing sequence, the resist dots 40 are completely removed from tht first major surface 42, by methods known in the art, to open the temporary apertures 54 in the metal layer 52. Those portions of the metal substrate 44 which are accessible through the temporary apertures 54 in the metal layer 52 and the perforations 50 of the resist film 48, are removed by etching with a suitable material. Where the substrate metal is iron or steel, ferric chloride can be used as an etchant and nickel, which is significantly more resistant to attack by ferric chloride than iron or steel, can serve as the second metal for the layer 52. With a steel substrate having a thickness of about 0.006 inch, the etching time is about 2 to 5 minutes with a 40 to 45 Baumé aqueous ferric chloride solution, the etching time varying with the temperature of the etchant. Etching may be carried out, for example, by spraying the etching material on the metal-resist bearing substrate 44 by means of spray guns 60 in a manner known in the art. Such etching can be done through the perforations 50 and/or through the temporary apertures 54. The etching operation is carried out to remove these portions of the metal substrate 44 located directly between the perforations 50 in the resist film 48 and the temporary apertures 54 in the metal layer 52, as well as other portions of the substrate 44 lateral thereto, thereby providing permanent apertures 62 of an ultimate size larger than the temporary apertures 54. The relative extent and shape (i.e., substantially ellipsoidal) of the ultimate-size apertures 62 is generally as shown in FIG. 4, the temporary apertures 54 and the perforations 50 opening into the ultimate-size apertures 62. It is perferred that the ultimate-size apertures 62 and respective temporary apertures 54 be substantially concentric. By choosing as the second metal one which is more resistant to chemical attack by the etching materials than the first metal, these etching materials have a minimal effect on the shape and dimensions of the temporary apertures 54. By keeping the temporary apertures 54 substantially intact, the shape and dimensions of the phosphor areas which are printed with the use of these temporary apertures, are more nearly those which are desired and for which the temporary apertures were intended. It is to be noted that the ultimate-size apertures 62 are larger than the temporary apertures 54; that is, the smallest cross-sectional dimension of each ultimate-size aperture 62 is greater than the smallest cross-sectional dimension of its respective temporary aperture 54. Also, the size of the temporary apertures is such that subsequently-printed phosphor areas will be of the desired dimension. A minimum temporary aperture diameter (as measured at the center of the screen) of about 12 mils and a minimum ultimate-size aperture diameter of about 16 mils are satisfactory. An ultimate-size aperture of about 16 mils will provide an electron beam spot size of about 17.8 mils and a temporary aperture diameter of about 12 mils will result in a phosphor area diameter of about 14 mils. While the ultimate-size permanent apertures 62 are shown to be of substantially ellipsoidal configuration, apertures of other (not shown) configurations (e.g., substantially cylindrical, spherical, or frusto-conical) may be produced.

In a subsequent step (FIG. 5) the resist layer 48 is completely removed from the metal substrate 44 to provide a preliminary mask 64 having both temporary apertures 54 of a first size (which is such that subsequently-printed phosphor areas will be of the desired dimensions) and permanent apertures 62 of a larger ultimate size. Where the kinescope screen is of a substantially spherical or other non-planar configuration, the preliminary mask 64 (including the metal layer 52) is shaped by methods (not shown) known in the art, to the general configuration of the screen and can then be mounted on a suitable support means to provide a preliminary mask assembly. The present invention is not limited to non-planar image screens and masks but is equally applicable to those of planar configuration.

Figure 6:
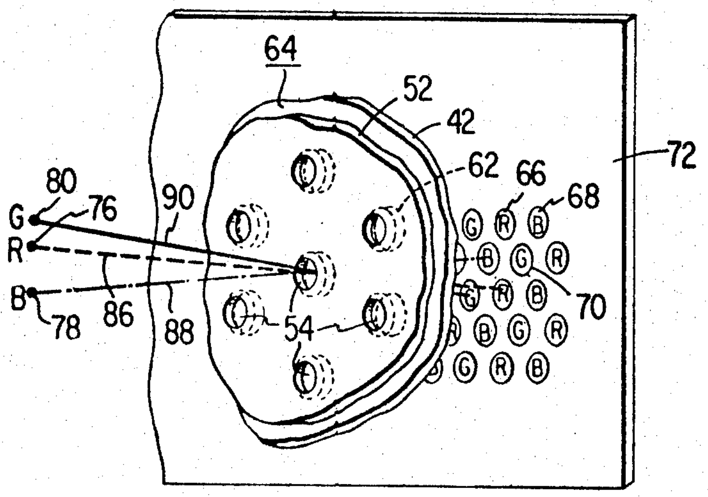
FIG. 6 is a fragmentary perspective sectional view of said preliminary mask of FIG. 5 in position for use as a photographic master in preparing an image screen for a kinescope.

The preliminary mask 64, is then (FIG. 6) positioned in spaced relation with a suitable transparent substrate 72 (e.g., a faceplate panel) and used as a photographic master in the screen printing operation to "print" the various elemental phosphor areas 66, 68 and 70 comprising the respective phosphor groups (red, blue, and green) on the substrate 72. The printing proces is known in the art (see, for example, U.S. Pat. 3,406,068 to H. B. Law). Briefly, one surface of the transparent substrate is coated with a mixture comprisnig a first one of the desired phosphors and a suitable photosensitive material and then exposed to a suitable light which is passed through the temporary apertures 54 of the preliminary mask 64. Those portions of the phosphor coating struck by the light rays are hardened. Then, the unhardened portions of the coating are removed, by washing, for example, leaving a pattern of phosphors of a first color mixed with the hardened resist material. This sequence of steps is repeated for the other phosphors. The hardened resist material is subsequently removed from the phosphor dots by baking or by chemical dissolution methods known in the art. An electron gun (not shown) intended for a particular phosphor group is located at a point 76, 78, or 80 so as to be in substantially the same spatial relation with the image screen as the light source (not shown) used for printing that particular phosphor group. The paths followed by the light rays during printing and by the electrons during operation of the kinescope are indicated, for purposes of illustration, by the lines 86, 88 and 90. It is preferred that during the printing operation, the preliminary mask 64 be disposed such that the metal layer 52 thereof faces the light source. This is to achieve more collimated light rays, which provide more sharply defined phosphor areas. The aforementioned preference for a relatively thin metal layer 52 for providing apertures having a sharper knife-edge also lends to more sharply defined phosphor areas.

Figure 5:
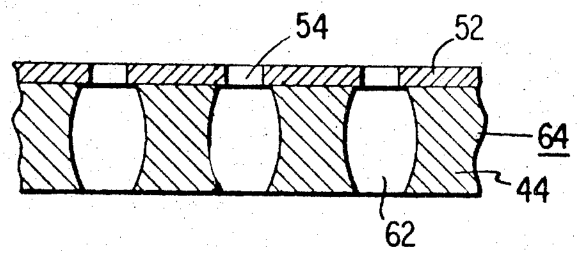
FIG. 5 is a fragmentary sectional elevation view of a preliminary mask produced according to said embodiment of the present invention, the preliminary mask comprising a substrate with ultimate-size apertures and a metal layer, on the substrate, having temporary apertures.

The screen printing operation may include providing, with the use of the preliminary mask disclosed herein, a light-absorbing matrix (not shown) of an opaque, non-light-reflective material to the image screen. This can be done, for example, by coating a surface of the bare transparent substrate with a relatively translucent mixture comprised of a material which has a relatively low light absorption and is convertible to a condition which is highly light-absorbing in comparison (e.g., manganese oxalate or manganese carbonate, which can be converted from a comparatively translucent condition to an opaque, non-light-reflective condition by heating in a manner known in the art) and a "positive-type" photosensitive resist (i.e., one which is soluble where exposed to light and remains insoluble elsewhere) and then exposing the coating to suitable light passed through the temporary apertures of a preliminary mask 64 (FIG. 5). Then, the unhardened portions of the coating are washed away and the relatively low light-absorbing material of the remaining portions of the coating is converted to its light-absorbing condition. The phosphor areas are then printed at openings in the matrix, as described above. The phosphor areas may, if desired, be somewhat larger than the openings of the matrix so that portions of the respective phosphor areas are disposed on the matrix itself. The "effective size" of such phosphor areas is, therefore, equal to the size of their respective matrix openings. As used with respect to the phosphor areas of a matrix-bearing image screen, the term "size" is defined to be the effective size thereof. Where it is desired, the phosphor areas may be printed before the conversion of the material to its light-absorbing condition. Alternatively, the phospor areas may be printed before the provision of the matrix, the preliminary mask being used for producing both. Where it is desired, a light-absorbing matrix, only, can be provided to a bare, transparent substrate, with the phosphor printing being done by applying a phosphor-photoresist mixture to the substrate surface on which the matrix is located and, then, exposing the mixture to light from a source located on the side of the substrate opposite the surface thereof bearing the matrix, the light passing through and being defined by the matrix openings.

Upon completion of the image screen, the metal layer 52 is removed from the apertured substrate 44 to provide a color-selection barrier (not shown). Such removal of the metal layer 52 can be done by methods known in the art with relatively little, if any, effect on the apertured substrate 44. For example, where the preliminary mask 64 (FIG. 5) is comprised of a nickel layer on an iron or steel substrate, the layer can be removed by placing the preliminary mask 64 in a room temperature bath comprising 2 parts water and 3 parts sulfuric acid and applying a reverse D.C. of six volts to the preliminary mask 64.

Figure 7:
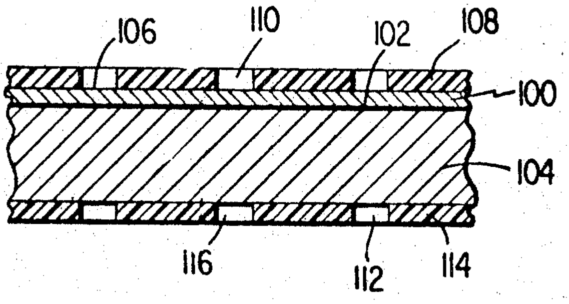
FIG. 7 is a fragmentary sectional elevation view of a structure made in an initial step of a second embodiment of the present invention, which structure is fabricated into a preliminary structure.

FIG. 7 illustrates another embodiment of the novel invention herein. A continuous layer 100 of a second meal (e.g., nickel) is disposed on a first major surface 102 of a substrate 104 of a first metal (e.g., steel). The thickness of the layer 100 is preferably less than 20 percent that of the substrate 104. On the available surface 106 of the metal layer 100, there is disposed by photographic methods known in the art, a coating 108 of resist material (which is insoluble in the etchants used) containing a plurality of perforations 110 of predetermined size. A second major surface 112 of the substrate 104 is covered with a film 114 of a resist material (which is substantially insoluble in the etchants used) containing perforations 116 which are at least as large as the perforations 110 in the resist coating 108. These perforations 110 and 116 in the resist coating 108 and the resist film 114, respectively, extend to the respective surfaces 102 and 112 and are centered at those sites on the metal substrate 104 where the apertures of ultimate size for the color selection barrier are desired.

Only those portions of the metal layer 100 which are accessible through the perforations 110 in the coating 108 are then removed (for example, by etching with an aqueous ferric chloride solution of about 40 to 45 Baumé where the second metal is nickel) to provide temporary apertures (not shown) of a first size in the metal layer 100. These temporary apertures are substantially the same size and configuration as the perforations 110. Thereafter, the resist coating 108 is completely removed and etching of the metal substrate 104 is carried out through the temporary apertures (not shown) in the metal layer 100 and/or the perforations 116 in the resist film 114. This etching operation provides the metal substrate 104 with permanent apertures of an ultimate size greater than the above first size of the temporary apertures. The materials and the etching and subsequent processing steps (i.e., mask shaping, screen printing, etc.), as well as the relative extent and shape of the ultimate-size apertures, are substantially the same as those described above with respect to the first embodiment. The metal substrate 104 with permanent apertures of ultimate size (not shown) therein is subsequently incorporated (along with the completed image screen) into a kinescope and used as a color selection barrier. This embodiment is employable with sheets or bands of nickel-clad steel and other suitable clad-metal sheets, many of which are commercially available.

While the present invention is generally described in terms of a color selection barrier of the shadow mask variety, it is also useful for producing kinescopes containing focusing masks and other lensing type masks. These focusing masks may be of the positive or negative tolerance varieties mentioned above. The present invention is also applicable to the production of kinescopes including grill masks and line screens. There, the general procedures disclosed above are followed with the openings of the substrate, the metal layers, and the resist films having a slot-like configuration, the temporary apertures of the metal layer being smaller than the permanent apertures of the substrate.

The use of the novel method herein for printing kinescope image screens and providing final color selection barriers, as well as the novel preliminary mask produced by this method, results in a number of advantages, especially from a commercial standpoint. Among them is the capability of annealing the preliminary masks having temporary apertures with a minimum deleterious effect on the preliminary mask. This allows the use of continuous manufacturing processes for the production of preliminary masks from bands of comparatively hard conductive material. The comparative hardness of the band material minimizes tearing and/or deformation thereof during the manufacture of the masks, which results in a relatively high mask production yield. The employment of continuous manufacturing processes lends to an increased production efficiency and a lower production cost per mask. Other advantages of the novel method are that the materials (i.e., metals) used for the apertured layers of the preliminary masks are naturally opaque so that no special opaquing measures are required and are sufficiently strong to withstand ordinary handling with relatively little, if any, injury thereto and yet are sufficiently ductile to withstand injury during the mask-shaping operation. Also, the novel method provides preliminary masks whose temporary apertures exhibit an increased ability to withstand wear and the deleterious effects of etching solutions. This results in temporary apertures whose configuration and dimensions remain relatively unaltered by processing operations. This leads to the phosphor areas, which are printed with the use of the preliminary screen, having a more uniform configuration and size. Other advantages are the achievability (with the maintenance of the desired kinescope operating tolerances) of significantly larger size differences between the permanent apertures of ultimate size of a color selection barrier and phosphor areas associated therewith, than methods used in the prior art. Also, the screen printing operation is significantly less sensitive to any existing variations in light distribution than the prior art methods, thereby allowing greater latitude in the selection of screen printing parameters. Furthermore, the exposure time for screen printing is not as critical with the present invention as it is with prior art methods, thereby facilitating the printing process.

What is claimed is:

1. The method for producing a color kinescope of the type comprising:

(i) an image screen including a faceplate panel having a plurality of elemental phosphor areas on the inner surface thereof, said phosphor areas comprising at least two different phosphor groups, and (ii) a color selection barrier having therein a plurality of permanent apertures of ultimate size located at predetermined sites in said barrier and in relation to said phosphor areas, said color selection barrier being prepared from a preliminary mask having temporary apertures therein, said temporary apertures used for printing said phosphor areas, said method comprising the steps of:

(a) providing on a first one of two substantially parallel major surfaces of a substrate comprising a first layer of a first metal, a continuous second layer of a second metal, said continuous second layer being significantly thinner than said substrate and bonded thereto;

(b) disposing on said second metal a first resist coating having perforations therein centered on said predetermined sites of said substrate, said perforations in said first resist coating being substantially equal to the desired size of said temporary apertures;

(c) disposing on the second one of said major surfaces of said substrate a second resist coating having perforations therein in substantial register with and at least as large as said temporary apertures, portions of said substrate being accessible therethrough;

(d) etching substantially only portions of said second metal accessible through said perforations in said first resist coating to produce said temporary apertures therein, said temporary apertures extending at least to said first major surface of said substrate;

(e) etching portions of said substrate accessible through said perforations in said second resist coating to provide permanent apertures of a predetermined ultimate size therein, said temporary apertures of said second metal and said perforations of said second resist film opening into respective ones of said permanent apertures of ultimate size, said substrate being etched preferentially to said second metal, said ultimate-size apertures being significantly larger than said temporary apertures so that portions of said second metal project beyond the edges of said ultimate-size apertures;

(f) removing all of said resist film from said substrate and said second metal, thereby producing said preliminary mask;

(g) printing a first one of said phosphor groups by depositing a first mixture comprised of a photoresist material and a first phosphor material on said surface of said transparent substrate and exposing said deposit to appropriate radiation passed through said temporary apertures of said preliminary mask;

(h) printing a second one of said phosphor groups by depositing a second mixture comprised of a photoresist material and a second phosphor material on said surface of said faceplate panel and exposing said deposit to appropriate radiation passing through said temporary apertures of said preliminary mask;

(i) completely removing said second metal having said temporary apertures from said substrate having said permanent apertures of ultimate size, thereby providing said color-selection barrier;

(j) positioning said color selection barrier in spaced relation with said image screen; and (k) incorporating said color selection barrier and said image screen into said kinescope.

2. The method defined in claim 1 wherein said first metal is steel, and said second metal is nickel, said first layer of nickel and said second layer of steel capable of being etched with a ferric chloride solution of about 40 to 45 Baumé.

References Cited

UNITED STATES PATENTS

| | | | |
|---|---|---|---|
| 3,574,013 | 4/1971 | Frantzen | 96—36.1 |
| 3,365,292 | 1/1968 | Fiore et al. | 96—36.1 |
| 3,423,261 | 1/1969 | Frantzen | 156—11 |
| 2,961,314 | 11/1960 | Amdursky et al. | 96—36.1 |

J. TRAVIS BROWN, Primary Examiner

R. L. SCHILLING, Assistant Examiner